United States Patent
Briesewitz et al.

(10) Patent No.: US 12,409,825 B2
(45) Date of Patent: Sep. 9, 2025

(54) HYDRAULIC UNIT

(71) Applicant: Continental Teves AG & Co. OHG, Frankfurt am Main (DE)

(72) Inventors: Rüdiger Briesewitz, Bruchköbel (DE); Joseph Dolmaya, Langen (DE); Mike Hirsemann, Darmstadt (DE); Christian Rene Koch, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 1030 days.

(21) Appl. No.: 17/593,105

(22) PCT Filed: Mar. 10, 2020

(86) PCT No.: PCT/EP2020/056325
§ 371 (c)(1),
(2) Date: Sep. 9, 2021

(87) PCT Pub. No.: WO2020/182801
PCT Pub. Date: Sep. 17, 2020

(65) Prior Publication Data
US 2022/0135014 A1 May 5, 2022

(30) Foreign Application Priority Data
Mar. 12, 2019 (DE) .............. 10 2019 203 308.3

(51) Int. Cl.
*B60T 13/68* (2006.01)
*B60T 13/14* (2006.01)
*B60T 13/74* (2006.01)

(52) U.S. Cl.
CPC .......... *B60T 13/686* (2013.01); *B60T 13/142* (2013.01); *B60T 13/745* (2013.01)

(58) Field of Classification Search
CPC ...... B60T 8/368; B60T 8/4081; B60T 13/686; B60T 13/745; B60T 8/4086; B60T 13/142
See application file for complete search history.

(56) References Cited

U.S. PATENT DOCUMENTS 6,634,723 B1 * 10/2003 Ganzel .................... B60T 8/368
  303/DIG. 10
8,038,230 B2 * 10/2011 Nakamura ............ B60T 8/4031
  303/119.3
8,662,601 B2 * 3/2014 Nakazawa .............. B60T 11/16
  303/DIG. 10

(Continued)

FOREIGN PATENT DOCUMENTS

CN 101121404 A 2/2008
CN 102015391 A 4/2011

(Continued)

OTHER PUBLICATIONS

CN 201208960 Y (Year: 2009).*

(Continued)

*Primary Examiner* — Robert A. Siconolfi
*Assistant Examiner* — Mahbubur Rashid

(57) ABSTRACT

A hydraulic unit for a slip-controlled brake system, the simulator receiving hole of which is aligned transversely to a master cylinder hole in a receiving body of the hydraulic unit, thus enabling a section of the simulator to be received in a cap of a control unit.

11 Claims, 2 Drawing Sheets

(56) References Cited

U.S. PATENT DOCUMENTS

| | | | |
|---|---|---|---|
| 9,899,983 B2* | 2/2018 | Nakamura | B60T 13/662 |
| 10,179,575 B2 | 1/2019 | Shin et al. | |
| 11,745,712 B2 | 9/2023 | Jeon | |
| 2003/0205932 A1* | 11/2003 | Anderson | B60T 11/20 |
| | | | 303/114.1 |
| 2004/0181381 A1* | 9/2004 | Matsuhashi | B60T 8/4081 |
| | | | 703/7 |
| 2007/0018498 A1* | 1/2007 | Nakazawa | B60T 8/4081 |
| | | | 303/119.3 |
| 2008/0036295 A1 | 2/2008 | Sakai | |
| 2011/0036434 A1 | 2/2011 | Fischbach-Borazio et al. | |
| 2011/0062775 A1* | 3/2011 | Iyatani | G01P 1/02 |
| | | | 361/752 |
| 2011/0273006 A1* | 11/2011 | Nakazawa | B60T 8/368 |
| | | | 303/10 |
| 2014/0144732 A1 | 5/2014 | Bayer et al. | |
| 2014/0360177 A1* | 12/2014 | Ryu | G05G 5/03 |
| | | | 60/556 |
| 2018/0245573 A1 | 8/2018 | Maruo | |
| 2018/0362006 A1* | 12/2018 | Weh | G05G 5/03 |
| 2019/0016321 A1* | 1/2019 | Dinkel | B60T 8/4081 |
| 2019/0031164 A1* | 1/2019 | Tandler | B60T 8/368 |
| 2020/0172076 A1* | 6/2020 | Weh | B60T 7/042 |

FOREIGN PATENT DOCUMENTS

| | | |
|---|---|---|
| CN | 103502066 A | 1/2014 |
| CN | 105523024 A | 4/2016 |
| CN | 105984451 A | 10/2016 |
| DE | 102012213216 A1 | 2/2013 |
| DE | 112014002567 T5 | 3/2016 |
| DE | 102016202113 A1 | 8/2017 |
| DE | 112016004499 T5 | 6/2018 |
| DE | 102018220573 A1 * 6/2020 ............ B60T 13/662 |
| WO | 2004048173 A2 | 6/2004 |

OTHER PUBLICATIONS

DE 102016202113 A1 (Year: 2017).*
German Search Report issued on Mar. 13, 2020, for the counterpart German Application No. 10 2019 203 308.3.
International Search Report and the Written Opinion of the International Searching Authority mailed on Apr. 28, 2020, for the counterpart PCT Application No. PCT/EP2020/056325.
Request for the Submission of an Opinion dated Dec. 28, 2022 for the counterpart Korean Patent Application No. 10-2021-7026092.
Written Opinion for the counterpart Korean Patent Application No. 10-2021-7026092.
Chinese First Office Action dated Mar. 21, 2023 for the counterpart Chinese Patent Application No. 20208002019.2 and DeepL translation of same.

* cited by examiner ized Application No. PCT/
HYDRAULIC UNIT

CROSS-REFERENCE TO RELATED APPLICATIONS

The present application is a National Stage Application under 35 U.S.C. 371 of International Application No. PCT/EP2020/056325, filed on Mar. 10, 2020, which claims priority from German Patent Application No. 102019203308.3 filed on Mar. 12, 2019, in the German Patent and Trade Mark Office, the disclosures of which are herein incorporated by reference in their entireties.

BACKGROUND

1. Field

Embodiments of the present application relate to a hydraulic unit for a slip-controlled brake system.

2. Description of Related Art

A hydraulic unit of the type mentioned above is already known from DE 10 2012 213 216 A1. The hydraulic unit comprises a block-shaped receiving body, which has a plurality of valve receiving holes for electromagnetically actuable pressure control valves, having a through hole in the receiving body for a pressure generator that can be activated by electric motor, for which purpose the through hole is aligned parallel to the direction of entry of the valve receiving holes into the receiving body, having a master cylinder hole for receiving a master cylinder piston actuable by means of a brake pedal, said master cylinder hole opening into the receiving body transversely to the through hole and being connected to a pressure medium reservoir, having a simulator receiving hole for a brake pedal feel simulator, which, within the simulator receiving hole, has a simulator piston, which is acted upon hydraulically by the master cylinder piston, and a simulator spring, which counteracts the hydraulic pressure produced by the master cylinder piston, and having a plurality of pressure medium channels, which interlink the valve receiving holes, the pressure generator, the master cylinder hole and the simulator receiving hole, within the receiving body, into which there open a plurality of wheel brake connections, which can be connected via the pressure medium channels to a plurality of wheel brakes of the brake system.

The hydraulic unit has the disadvantage that small-volume and thus compact integration of the simulator into the block-shaped receiving body cannot be achieved in an optimum manner owing to the parallel alignment of the simulator receiving hole with the master cylinder receiving hole.

SUMMARY

It is therefore the object of the present application to design a hydraulic unit of the stated type in a manner which is as simple, economical and capable of miniaturization as possible without at the same time having to accept restrictions in respect of the functionality of the individual components.

Said object is achieved for a hydraulic unit of the stated type by means of the features of patent claim 1.

BRIEF DESCRIPTION OF THE DRAWINGS

Further features and advantages of the invention are explained below with reference to the description of a number of exemplary embodiments, in which.

DETAILED DESCRIPTION OF EMBODIMENTS

Before the special features of the individual exemplary embodiments are described, the basic construction of the subject matter of the present application will first of all be explained.

Figure 1:
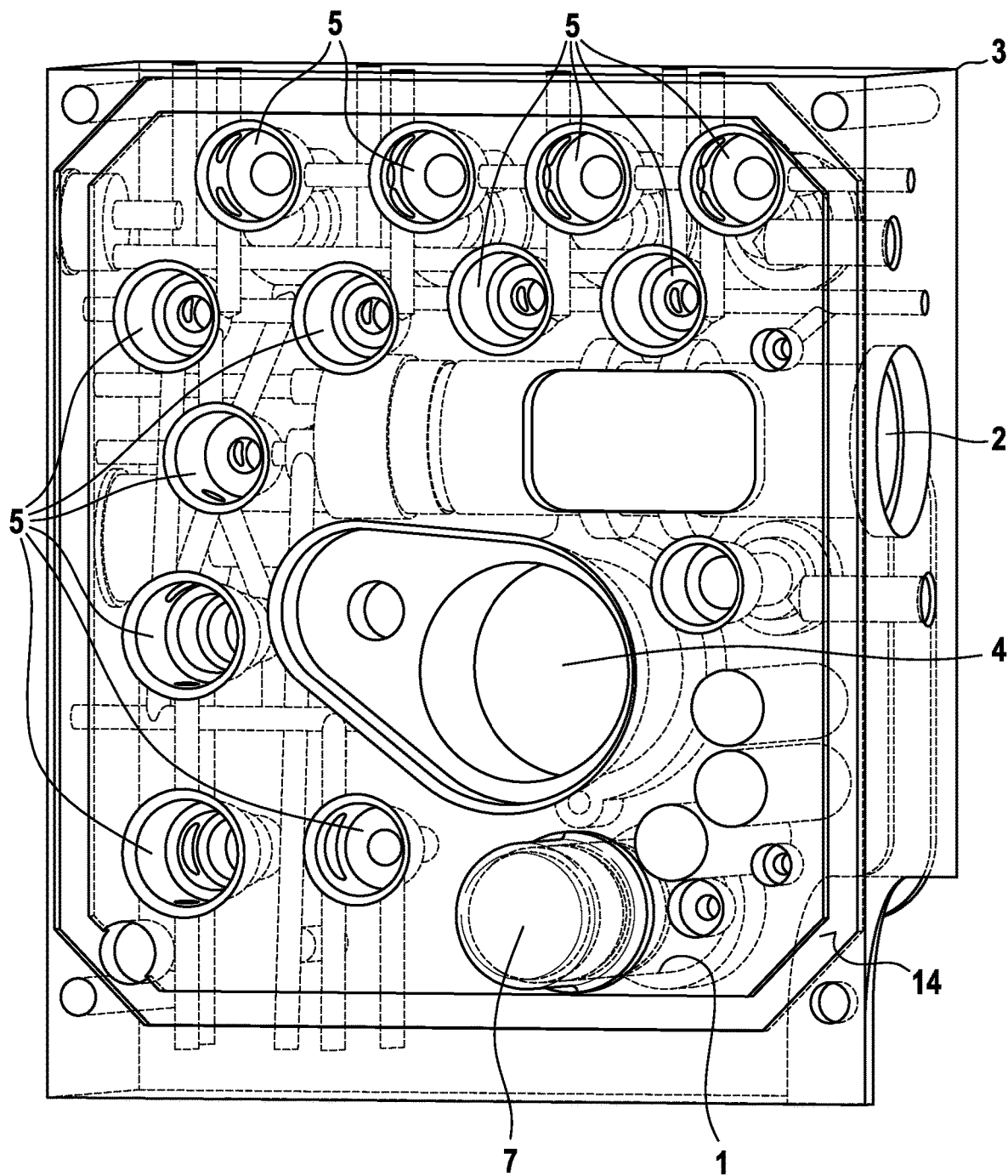
FIG. 1 shows in perspective view the receiving body for the hydraulic unit according to the invention in a plan view of an end face of the receiving body on which a control unit can be secured.

Fundamentally, the hydraulic unit has a block-shaped receiving body 3, into the end face of which, which is depicted in FIG. 1, there open a plurality of valve receiving holes 5 for electromagnetically actuatable pressure control valves, a through hole 4 for a pressure generator that can be activated by electric motor, a master cylinder hole 2, which opens into the receiving body 3 transversely to the through hole 4 and is connected to a pressure medium reservoir, a simulator receiving hole 1, and a plurality of pressure medium channels, which interlink the valve receiving holes 5, the pressure generator, the master cylinder hole 2 and the simulator receiving hole 1, wherein a plurality of wheel brake connections, which can be connected via the pressure medium channels to a plurality of wheel brakes of a slip-controlled brake system, are provided on the receiving body 3.

As is apparent from FIG. 1, the through hole 4 provided for the pressure generator is aligned parallel to the direction of entry of the valve receiving holes 5 into the receiving body 3. For the reception of a master cylinder piston actuatable by a brake pedal, the master cylinder hole 2 is in contrast aligned transversely to the through hole 4 in the receiving body 3.

The simulator receiving hole 1 receives a brake pedal feel simulator (referred to below as a "simulator"), which, within the simulator receiving hole 1, has a simulator piston 9, which is acted upon hydraulically by the master cylinder piston, and a simulator spring 8, which counteracts the hydraulic pressure produced by the master cylinder piston.

In order to be able to implement as compact as possible integration of the simulator into the block-shaped receiving body 3, the simulator receiving hole 1 is aligned transversely to the master cylinder hole 2 in the receiving body 3, whereby the simulator receiving hole 1 opens perpendicularly into the end face of the receiving body 3 which can be seen in the plan view in FIG. 1 and which can be completely sealed in a leak-tight manner by a cap 6 of an electronic control unit. In this regard, the frame-shaped bearing surface 14 of the cap 6 in the region of the end face can be seen from FIG. 1.

As a result, a particularly advantageous arrangement of the simulator receiving hole 1 in the receiving body 3 is obtained, the simulator receiving hole thus extending parallel to the through hole 4 of the pressure generator that can be activated by electric motor and parallel to the valve receiving holes 5 in the receiving body 3.

Figure 3:
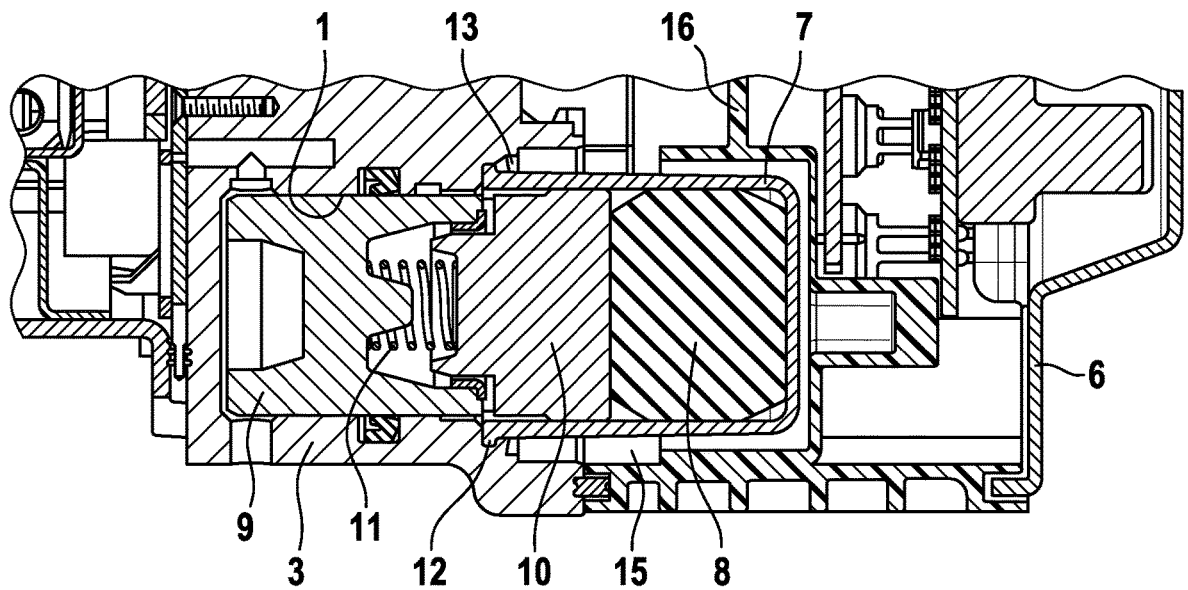
FIG. 3 shows a longitudinal section through the receiving body in the region of the simulator, which is covered by a cap of an electronic control unit.

The cavity 15, visible in FIG. 3, in the cap 6 covering the valve receiving holes 5, which is matched to the outer contour of the receiving body 3, is thus used for the integration of the simulator, the cover 7 of which, which projects from the receiving body 3, extends unhindered into the available cavity 15 of the cap 6. In this regard, FIG. 3 shows an overall view of the simulator, which extends partially into the receiving body 3 and into the cap 6 of the control unit.

For the actuation of the pressure control valves to be inserted into the valve receiving holes 5 and of the pressure generator that can be activated by electric motor, a plurality of electronic and/or electromechanical components, in particular circuits and/or valve magnet coils, are integrated into the cap 6, being separated from the simulator by an intermediate wall 16. In this case, the cover 7 of the simulator is partially divided by means of the intermediate wall 16 into a chamber, thereby promoting as high as possible stability of the cap 6.

Figure 2:
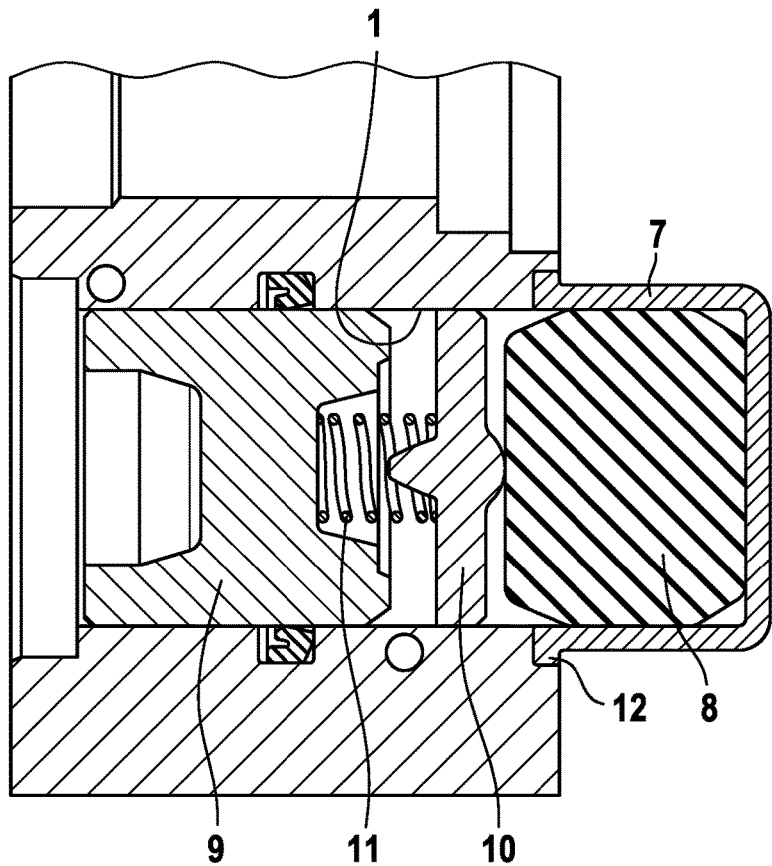
FIG. 2 shows a longitudinal section through the receiving body according to FIG. 1 in the region of the simulator receiving hole to illustrate the simulator components.

It is clear from FIGS. 2 and 3 that the simulator receiving hole 1 is closed by a pot-shaped cover 7, in which the simulator spring 8 is received. A cylindrical pressure piece 10, which is matched with play to the diameter of the simulator receiving hole 1 and is guided in an axially movable manner in the simulator receiving hole 1, is inserted between the simulator piston 9 and the simulator spring 8. The pressure piece 10 is acted upon in the direction of the simulator spring 8 by a helical spring 11 supported on the end of the simulator piston 9 which faces the pressure piece 10. The simulator spring 8 preferably consists of a rubber block which is matched to the pot-shaped inner contour of the cover 7.

The pot-shaped cover 7 has a rim 12 which is cranked radially outward and is fixed in the region of the simulator receiving hole 1 by means of plastic material deformation of the receiving body 3 in the manner of staking.

A ventilation point 13, which, according to FIG. 3, advantageously produces an atmospheric pressure equalization within the cap 6 covering the simulator and valve receiving holes 1, 5, is provided between the simulator piston 9 and the cover 7. In a preferred embodiment, the ventilation point 13 is produced by a notch in the rim 12 of the cover 7, and, according to FIG. 3, said notch extends along the outer surface of the cover 7 in the direction of the cavity 14, which has shielded ventilation to the atmosphere via a diaphragm inserted in the cap 6, for example.

Consequently, it is thereby possible to avoid direct pressure equalization of the simulator with respect to the atmosphere, and it is therefore possible to dispense with an unshielded, corrosion-prone ventilation hole in the receiving body 3.

By means of the proposed invention, complete integration of the simulator between the receiving body 3 and the control unit cap 6 closing the receiving body 3 can be achieved. At the same time, the proposed invention simplifies the effort involved in arranging the holes for the components described in the receiving body 3 and promotes the installation of the individual components in the receiving holes of the receiving body 3 which have been presented at the outset.

The invention claimed is:

1. A hydraulic unit for a slip-controlled brake system, comprising:
   a block-shaped receiving body comprising a plurality of valve receiving holes for electromagnetically actuatable pressure control valves;
   a through hole in the block-shaped receiving body for a pressure generator activated by electric motor, for which the through hole is aligned parallel to a direction of entry of the valve receiving holes into the block-shaped receiving body;
   a master cylinder hole for receiving a master cylinder piston actuatable by means of a brake pedal, the master cylinder hole opening into the block-shaped receiving body transversely to the through hole and being connected to a pressure medium reservoir;
   a simulator receiving hole for a brake pedal feel simulator, which within the simulator receiving hole has a simulator piston, which is acted upon hydraulically by the master cylinder piston, and a simulator spring, which counteracts the hydraulic pressure produced by the master cylinder piston; and
   a plurality of pressure medium channels, which interlink the valve receiving holes, the pressure generator, the master cylinder hole and the simulator receiving hole, within the receiving body, into which there open a plurality of wheel brake connections, connectable via the pressure medium channels to a plurality of wheel brakes of the brake system,
   wherein the simulator receiving hole is aligned transversely to the master cylinder hole in the receiving body; and
   a pot shaped cover, wherein the simulator receiving hole is closed by the pot-shaped cover, wherein pot-shaped cover is directed into a cavity of a cap which covers the valve receiving holes, and that this cap integrates at least one of a plurality of electronic and electromechanical components wherein the pot-shaped cover comprises a rim cranked radially outward and is fixed in the region of the simulator receiving hole by means of plastic material deformation of the receiving body.

2. The hydraulic unit as claimed in claim 1, wherein the simulator receiving hole is arranged parallel to the through hole of the pressure generator activated by electric motor.

3. The hydraulic unit as claimed in claim 1, wherein the simulator receiving hole is aligned parallel to the valve receiving holes in the receiving body.

4. The hydraulic unit as claimed in claim 1, wherein the simulator receiving is matched to an outer contour of the receiving body.

5. The hydraulic unit as claimed in claim 1, wherein the at least one of the plurality of electronic and electromechanical components are for actuating the pressure control valves and the pressure generator activated by electric motor.

6. The hydraulic unit as claimed in claim 1, wherein the simulator spring is received within the pot-shaped cover.

7. The hydraulic unit as claimed in claim 1, further comprising a cylindrical pressure piece, which is matched with play to the diameter of the simulator receiving hole and is guided in an axially movable manner in the simulator receiving hole, is inserted between the simulator piston and the simulator spring.

8. The hydraulic unit as claimed in claim 7, wherein the cylindrical pressure piece is acted upon in the direction of the simulator spring by a helical spring supported on the end of the simulator piston which faces the pressure piece.

9. The hydraulic unit as claimed in claim 1, further comprising a ventilation point, which produces an atmospheric pressure equalization within a cap covering the simulator and valve receiving holes, provided between the simulator piston and the cover.

10. The hydraulic unit as claimed in claim 9, wherein the ventilation point is produced by a notch in the rim of the cover.

11. A hydraulic unit for a slip-controlled brake system, comprising:
- a block-shaped receiving body comprising a plurality of valve receiving holes for electromagnetically actuatable pressure control valves;
- a through hole in the block-shaped receiving body for a pressure generator activated by electric motor, for which the through hole is aligned parallel to a direction of entry of the valve receiving holes into the block-shaped receiving body;
- a master cylinder hole for receiving a master cylinder piston actuatable by means of a brake pedal, the master cylinder hole opening into the block-shaped receiving body transversely to the through hole and being connected to a pressure medium reservoir;
- a simulator receiving hole for a brake pedal feel simulator, which within the simulator receiving hole has a simulator piston, which is acted upon hydraulically by the master cylinder piston, and a simulator spring, which counteracts the hydraulic pressure produced by the master cylinder piston;
- a plurality of pressure medium channels, which interlink the valve receiving holes, the pressure generator, the master cylinder hole and the simulator receiving hole, within the receiving body, into which there open a plurality of wheel brake connections, connectable via the pressure medium channels to a plurality of wheel brakes of the brake system, wherein the simulator receiving hole is aligned transversely to the master cylinder hole in the receiving body;
- a pot shaped cover in which the simulator spring is received, wherein the simulator receiving hole is closed by the pot-shaped cover; and
- wherein the simulator spring consists of a rubber block which is matched to the pot-shaped inner contour of the cover.

* * * * *